US 6,748,752 B2

(12) United States Patent
Sarkisian et al.

(10) Patent No.: US 6,748,752 B2
(45) Date of Patent: Jun. 15, 2004

(54) APPARATUS AND METHOD FOR WEAK LIQUOR FLOW CONTROL IN AQUA-AMMONIA ABSORPTION CYCLES

(75) Inventors: Paul Sarkisian, Boulder City, NV (US); Lance Kirol, Morrisville, VT (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 10/125,298

(22) Filed: Apr. 16, 2002

(65) Prior Publication Data
US 2003/0192330 A1 Oct. 16, 2003

(51) Int. Cl.[7] .................................................. F25B 45/00
(52) U.S. Cl. ............................. 62/149; 62/141; 62/148; 62/238.3; 62/476
(58) Field of Search ....................... 62/141, 148, 238.3, 62/149, 476

(56) References Cited

U.S. PATENT DOCUMENTS

| 3,826,104 | A | * | 7/1974 | Lamb et al. ............ 62/149 |
| RE30,252 | E | * | 4/1980 | Leonard ............... 62/84 |
| 4,246,761 | A | * | 1/1981 | Phillips et al. ............ 62/148 |
| 4,596,122 | A | * | 6/1986 | Kantner ............... 62/141 |
| 4,718,243 | A | | 1/1988 | Buschulte et al. ......... 62/101 |
| 4,724,679 | A | * | 2/1988 | Radermacher ............ 62/101 |
| 5,367,884 | A | | 11/1994 | Phillips et al. ............ 62/101 |
| 5,490,393 | A | | 2/1996 | Fuesting et al. ............ 62/101 |
| 5,548,971 | A | | 8/1996 | Rockenfeller et al. ...... 62/324.2 |
| 5,572,884 | A | * | 11/1996 | Christensen et al. ......... 62/476 |
| 5,586,447 | A | * | 12/1996 | Sibik et al. ............... 62/141 |
| 5,675,982 | A | | 10/1997 | Kirol et al. ............... 62/225 |
| 5,682,755 | A | | 11/1997 | Uchida et al. .............. 62/148 |
| 5,771,710 | A | | 6/1998 | Erickson ................ 62/494 |
| 5,799,502 | A | | 9/1998 | Nomura et al. ............. 62/476 |
| 5,966,955 | A | * | 10/1999 | Maeda ................ 62/238.3 |
| RE36,684 | E | | 5/2000 | Rockenfeller et al. ...... 62/324.2 |
| 6,220,040 | B1 | * | 4/2001 | Sjoblom et al. ........... 62/112 |
| 6,332,328 | B1 | | 12/2001 | Bangheri ................ 62/148 |
| 6,397,625 | B1 | * | 6/2002 | Kunze ................... 62/476 |

FOREIGN PATENT DOCUMENTS

| DE | 1 401 483 A | 2/1969 |
| DE | 3344421 A1 | 6/1985 |
| DE | 3609306 A | 10/1986 |
| WO | WO 01/50075 A1 | 7/2001 |

OTHER PUBLICATIONS

Modahl, R.J. et al., "*Evaluation of a Commercial Advanced Absorption Heat Pump Breadboard*", The Trane Company, La Crosse, WI, (1988).

* cited by examiner

Primary Examiner—William C. Doerrler
Assistant Examiner—Mark Shulman
(74) Attorney, Agent, or Firm—Knobbe, Martens, Olson & Bear, LLP

(57) ABSTRACT

An aqua-ammonia absorption cooling and/or heating system actively controls the flow of weak liquor from the generator to the absorber, using one or more valves operated in response to weak liquor temperature, and/or pressure and/or concentration.

53 Claims, 4 Drawing Sheets

Valve plug drilled with small orifice when closed and larger orifice when open.

Valve plug drilled with fixed restriction when closed and minimal restriction when open.

Two-speed with parallel restrictions

Two-speed with series restrictions

Two-speed with parallel restrictions and two valves

Three-speed, expandable to any number of speeds.

APPARATUS AND METHOD FOR WEAK LIQUOR FLOW CONTROL IN AQUA-AMMONIA ABSORPTION CYCLES

BACKGROUND OF THE INVENTION

This invention relates to aqua-ammonia absorption cooling and/or heating systems utilizing ammonia refrigerant and aqueous absorbents. Improvements in the efficiencies of such systems includes the use of generator/absorber heat exchange cycles utilizing rich and weak absorption working fluids and/or by separate heat exchange loops referred to as GAX cycles. Descriptions of such systems are found in U.S. Pat. Nos. 4,311,019, 5,024,063, 5,271,235, 5,367,884, U.S. Pat. No. Re. 36,684 and R. J. Modahl and F. C. Hayes, "Evaluation of Commercial Advanced Absorption Heat Pump Bread Board," The Trane Company, pp. 117–125, 1988. Additional improvements are described in co-pending U.S. patent application Ser. Nos. 09/479,277, filed Jan. 5, 2000; 09/632,037, filed Aug. 3, 2000; 09/632,054 filed Aug. 3, 2000; and 09/709,875, filed Nov. 10, 2000. The description of the aforesaid patents and applications are incorporated herein by reference.

The present invention is directed to further improvement in efficiency of aqua-ammonia absorption systems. The circulation rate of the weak absorption fluid through an aqua-ammonia absorption system is an important factor in proper operation. The weak solution from the bottom end of the generator, also referred to herein as "weak liquor", has the lowest concentration of ammonia in the absorption cycle, typically between about 2% and about 20% ammonia, depending on operating mode (heating or cooling), operating conditions, and system design parameters. Excess ammonia in weak liquor decreases the amount of refrigerant generated for a given circulation of solution through the absorption cycle. Thus, the circulation rate must be increased to generate the required amount of refrigerant. Increased solution circulation rate increases the required heat input to the generator, and decreases system efficiency. This efficiency degradation is especially pronounced for GAX systems where circulation rate must be sufficiently high to absorb all refrigerant passing through the condenser and evaporator, but low enough for weak liquor to be adequately depleted in ammonia, which is necessary for the solution to absorb ammonia refrigerant. Moreover, in the case of strong-liquor GAX, ammonia depletion is important to allow the GAX section of the absorber to operate at temperatures sufficiently high for heat transfer to the strong liquor, i.e., absorption fluid solution having relatively high ammonia concentration. Weak liquor with excessive ammonia concentration and low bubble-point temperature reduces the amount of heat that can be recovered in the GAX absorber, thereby reducing system efficiency. Active control of weak liquor flow is needed for optimizing efficiency of the system by maintaining ammonia concentration in the weak liquor within a desired range when temperature conditions change or in systems where firing rate is changeable. As used herein, active weak liquor flow control is intended to mean control and adjustment of weak liquor flow in response to changes in the system or operating conditions in contrast to use only of a fixed restriction such as a fixed orifice or capillary tube. Such weak liquor flow control may also be used advantageously with systems having variable speed or multiple speed burners or firing rates. The terms "burner speed" and "firing rates" are used interchangeably herein.

SUMMARY OF THE INVENTION

As described herein, the flow of weak liquor from the bottom of the generator to the absorber is actively controlled using one or more valves, operated or adjusted in response to a condition or property of the weak liquor, for example, temperature, pressure, concentration and/or, in cooperation with operating conditions, temperatures and/or other sensible parameters.

In one embodiment, a valve and a temperature-sensing device in thermal contact with weak liquor are used to actively control the flow of weak liquor from the bottom of the generator to the absorber assembly. A preferred valve is capable of a continuous adjustment of the weak liquor flow in response to sensed temperature. In another embodiment, weak liquor flow is actively controlled in discrete steps rather than by continuous adjustment.

In another embodiment, weak liquor flow control is used in a system also using active control of refrigerant flow to the evaporator for controlling vapor superheat.

DETAILED DESCRIPTION OF THE PREFERRED EMBODIMENTS

Figure 1:
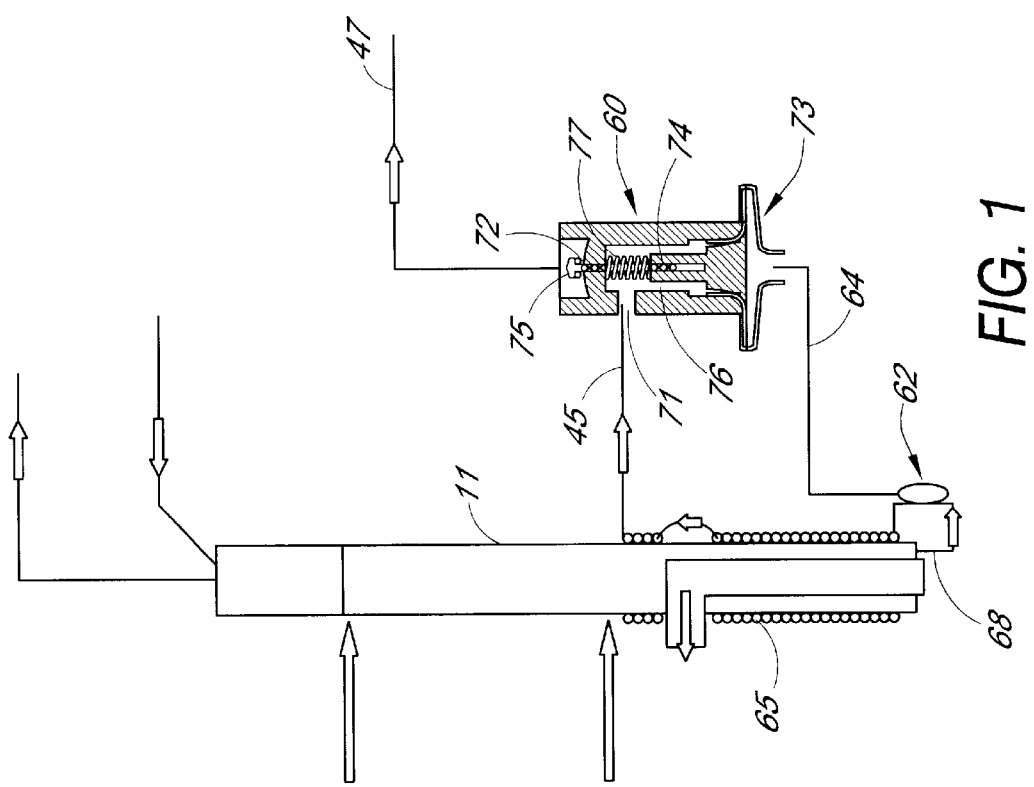
FIG. 1 is a schematic illustration showing a generator assembly and a valve and temperature-sensing bulb for controlling the flow of weak liquor.

Weak liquor flow control as described herein may be used with any aqua-ammonia absorption cooling and/or heating system having an absorber assembly, a generator assembly and an absorption fluid loop for directing absorption fluid between said absorber and generator assemblies. Such systems include a condenser, an evaporator and a refrigerant loop including piping for directing refrigerant from the generator assembly to the condenser and from the condenser to the evaporator. The aqua-ammonia absorption apparatus may perform cooling and/or heating functions. The apparatus include chillers, heat pumps, refrigeration equipment, heating-only appliances, and dual-temperature appliances. The latter are a special type of heat pump that is not reversed, and in which both heating and cooling are produced simultaneously for beneficial use. Such apparatus includes conventional aqua-ammonia systems as well as high-efficiency GAX apparatus, disclosed in the aforesaid patents and applications In an embodiment illustrated in FIG. 1, a temperature controlled valve 60 is used for controlling the flow of weak liquor from the generator 11 to an absorber (not shown). The valve is controlled by a temperature-sensing bulb 62 charged with a composition that produces pressure responsive to the temperature sensed by the bulb. The temperature-sensing bulb is installed in thermal contact with the weak liquor in the generator or as it passes through piping or heat exchange coils of the generator. Changes in bulb pressure resulting from changes in the pressure of the bulb charge composition, are directed to a moveable member such as a diaphragm or bellows in the valve resulting in opening and closing the valve in response to the pressure changes, or pressure differential between surfaces of the diaphragm. In the apparatus shown in FIG. 1, valve 60 is positioned between pipes 45 and 47 which direct the weak liquor from the bottom of generator 11 to an absorber (not shown). The valve assembly includes a temperature-sensing bulb 62 in thermal contact with weak-liquor pickup tube 68. Valve 60 is opened and closed in response to the temperature sensed by the bulb 62 in pipe 68 which directs the weak liquor from the bottom of the generator to the GHX (generator heat exchange) coil 65 and pipe 45. Alternatively, the bulb may be placed in thermal contact with the bottom of the generator, either on the outside of the shell where it indirectly measures solution temperature at the bottom of the generator, or in direct thermal contact with solution inside the bottom of the generator. The temperature-sensing bulb may be installed at any desirable location, preferably where the ammonia-weak solution is at or near its bubble-point temperature.

The valve is diaphragm-controlled with one side of the diaphragm exposed to the temperature-sensing bulb pressure and the other side to generator pressure. The valve components shown include inlet port 71, outlet port 72, diaphragm 73, actuator rod 74, valve plug 75, valve chamber 76 and spring 77. The valve 60 is installed so that the inlet port 71 of the valve receives weak liquor from the generator via pipe 45 and communicates with the valve chamber 76 which is exposed to the diaphragm 73, and the outlet port 72 communicates with pipe 47 for directing the weak liquor to the absorber assembly. The valve outlet port 72 is opened and closed in response to the pressure differential between the generator pressure and the temperature-sensing bulb pressure. The valve regulates weak solution flow rate so as to maintain concentration of ammonia in the weak solution within a desired range. The response of the valve depends on valve design parameters including diaphragm diameter, seat diameter, spring force, and bulb charge. Process parameters such as high-side and low-side pressures, i.e., pressures on the two sides of the valve plug, affect performance.

A water-ammonia bulb charge works well for weak liquor flow control, with the amount of ammonia in the bulb being slightly higher than the desired concentration of ammonia in the weak liquor. Useful ammonia concentrations are between about 1-20% and preferably between about 3% and about 10%. Relatively constant weak liquor concentration is achieved using relatively low spring forces, combined with lower ammonia concentrations in the bulb charge. Increased spring force and slightly higher ammonia fraction in the bulb charge changes the valve response toward increased weak liquor ammonia concentration at higher pressures. Increasing the amount of ammonia in the weak liquor at higher pressures is often more desirable than constant concentration, since it helps to limit generator temperature at high ambient temperatures.

Other bulb charge compositions may be substituted for the water/ammonia mixtures discussed above to obtain good performance characteristics. For example, ammonia complex compounds may be used, such as disclosed in U.S. Pat. No. 4,848,994, the description of which is incorporated herein by reference. A specific complex compound found to be useful is $FeCl_2.2/6(NH_3)$. Hydrated $BaCl_2$ having a coordination step of 1–2 mols of water, i.e., $BaCl_2.1/2(H_2O)$, or hydrated zeolites or carbon may also be used as suitable bulb charge.

Weak liquor is shown routed through GHX coil 65 in the lower section of the generator whereby heat is transferred from the hot weak liquor to the generator. As shown, the weak liquor flow control valve 60 is installed downstream of the GHX coil which is advantageous since it allows for maximum heat transfer from the weak liquor to the generator prior to decreasing pressure of the weak solution, thus allowing maximum heat recovery from the solution before flashing or letdown to lower pressure. Also, locating the valve in the coolest part of the weak liquor stream permits the valve to be designed for lower maximum operating temperature.

Other types of valves may be substituted for the diaphragm-operated valve described above. Any valve that responds to weak liquor temperature and/or pressure so as to maintain constant or near constant weak liquor concentration may be used. Another alternative is to use a valve responding directly to weak liquor concentration or to some physical property or condition correlated to weak liquor concentration. The apparatus may include one or more sensing devices for sensing or monitoring a condition of the absorption fluid, e.g. weak liquor, with the sensing device operatively communicating with a valve to control the valve in response to a sensed condition. The sensing device may be directly connected to the valve or indirectly operatively connected to the valve via an intermediate component, such as a control device, e.g. controller or microprocessor. Electronic valves operated in response to weak liquor temperature, pressure and/or concentration may also be used. For example, such electronic valves may be continuously variable valves, or open-closed valves operated in a pulsed fashion, with pulse-width modulation or similar control algorithm to control the amount of the time the valve is open. A pulse-width operation controlled valve may be responsive to generator temperature, pressure or other physical properties or conditions correlated to weak solution concentration, or could be set to provide two or more different flow rates in response to operating conditions of the absorption system.

Figure 2:
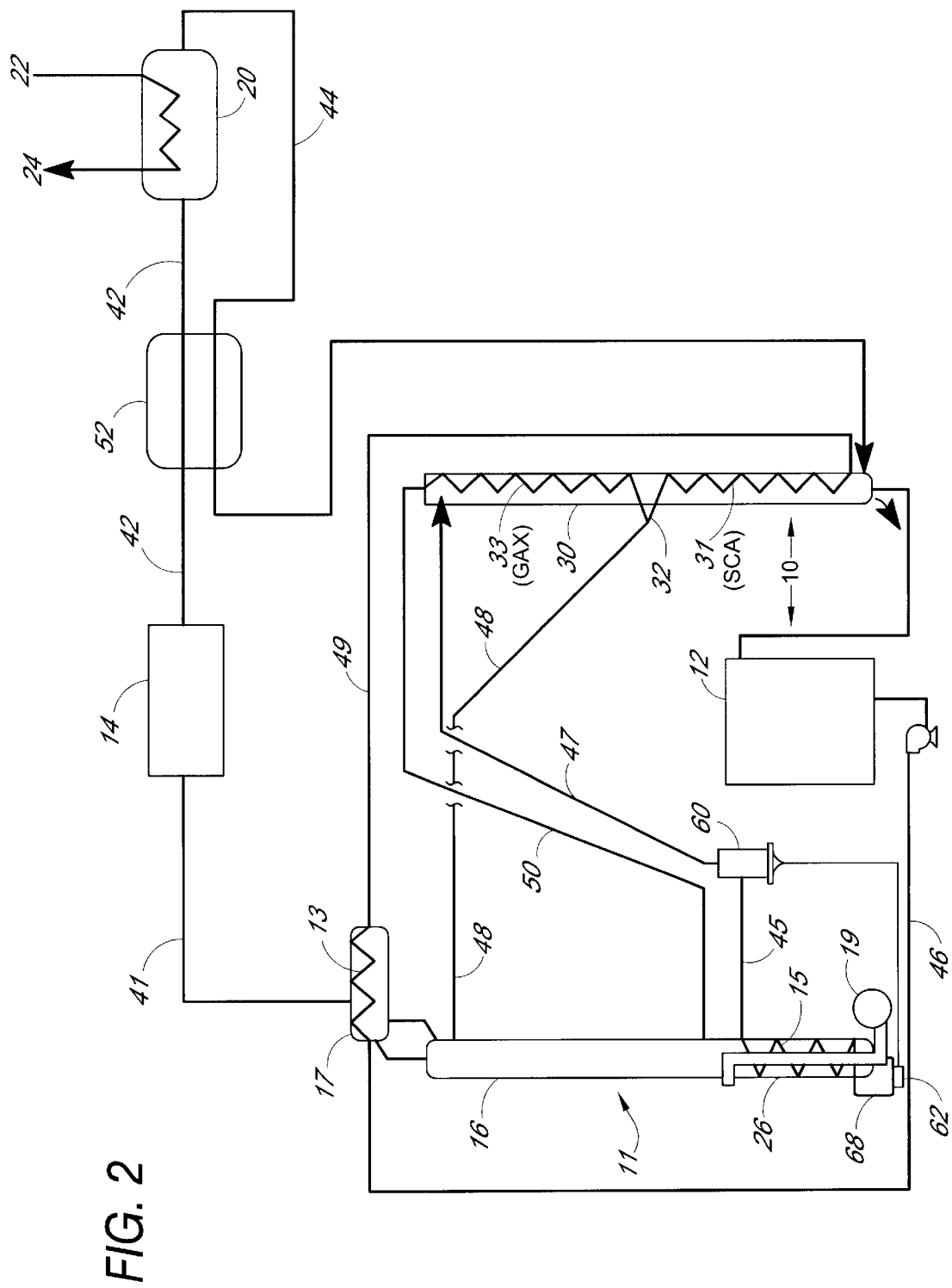
FIG. 2 is a schematic illustration of an aqua-ammonia absorption cooling system incorporating the valve and temperature-sensing bulb shown in FIG. 1 for controlling weak liquor flow from the generator to the absorber.

In a conventional system without the present invention, weak solution passes from the generator to the absorber without active control via a fixed flow restriction. FIG. 2 schematically illustrates an aqua-ammonia generator absorber heat-exchange (GAX) chiller system with continuous control of weak liquor flow using a valve as shown in FIG. 1. As shown in FIG. 2, weak solution passes from generator assembly 11 to absorber assembly 10 via valve 60 which continuously modulates the flow rate of the weak solution for maintaining the ammonia concentration therein within a desired range. The major components of the chiller system include an absorber assembly 10 comprising an absorber 12 and an absorber heat exchange section 30 which includes an absorber heat exchanger 31, sometimes referred to as a solution cooled absorber (SCA), and a GAX heat exchanger 33. The generator assembly 11 shown includes a generator heat exchanger 15, a boiler 26 having a burner 19 for heating and vaporizing the solution, an adiabatic section 16, and a rectifier section 17 with reflux coil 13. The burner may be of a single, multiple or variable capacity type, and may include a combustion air pre-heater. A condenser 14 and an evaporator 20 are the other major components of the system. The chiller system may also include a subcooler 52 for precooling refrigerant from the condenser with cold gaseous refrigerant from the evaporator. The absorber and condenser heat exchangers may be air or liquid cooled, and the rectifier 17 may be cooled by solution or water. Such a GAX chiller is well-known in the art, for example, U.S. Pat. Nos. 5,490,393 and 5,367,884, and in the aforesaid Modahl et al. publication, the descriptions of which are incorporated herein by reference.

During the operation of the illustrated GAX chiller apparatus, the relatively cool refrigerant-rich absorption fluid solution is pumped from the absorber via pipe 46 to heat exchange coil 13 within rectifier 17 after which it is directed via pipe 49 to the absorber heat exchanger 31 and GAX heat exchanger 33. In the embodiment shown, a flow splitter 32 splits the ammonia-rich absorption fluid (rich liquor) passing from absorber heat exchanger (SCA) 31, a first portion to the generator via pipe 48 and a second portion to GAX heat exchanger 33 and then to the generator via pipe 50. The refrigerant vapor from evaporator 20 is directed via pipe 44 to the absorber assembly 10. Weak absorption fluid or weak liquor is directed to the absorber assembly 10 from the generator via pipe 45, valve 60 and pipe 47. As the weak solution from the generator passes over the GAX heat exchanger 33 inside the absorber and over the absorber heat exchanger 31, it absorbs ammonia vapor. The advantages of a GAX system with flow split of a portion of the rich absorption fluid through the GAX heat exchanger are discussed in more detail in the aforesaid references, particularly in the Modahl et al. publication and the '884 patent. However, within the broad class of GAX systems, the present invention is not to be limited by the method of recovering GAX heat, whether it is by strong liquor, weak liquor, or a secondary fluid. Further, of strong liquor GAX recovery systems, the present invention is not to be limited by location of the flow split of rich liquor into GAX and non-GAX streams. In the FIG. 3 embodiment, the rich liquor is split at flow splitter 32' whereby a portion of rich liquor is directed to the generator via pipe 48' before rich liquor enters the SCA and GAX heat exchangers, whereas in FIG. 2 rich liquor flow splitter 32 is located between the SCA and GAX heat exchangers. The present invention is not limited to a GAX system and may be used in a conventional absorber heat exchange system, although the more efficient GAX cycle is preferred. The FIG. 2 embodiment is especially well suited for operation with continuously variable speed burner control.

Figure 3:
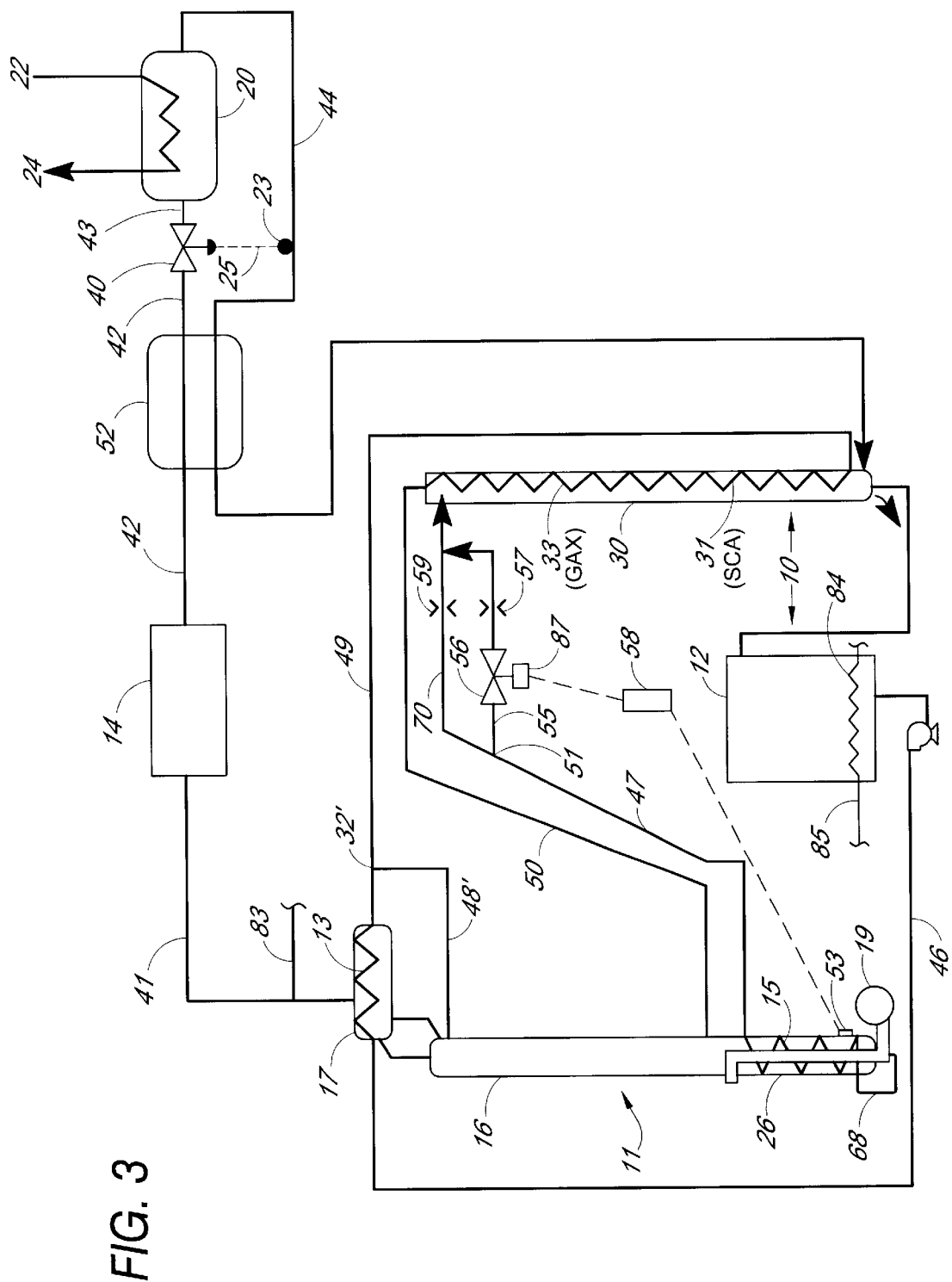
FIG. 3 is a schematic illustration of an aqua-ammonia cooling system showing the use of combined discrete weak liquor flow control and TXV control of refrigerant flow to the evaporator.

FIG. 3 schematically illustrates another embodiment of an aqua-ammonia chiller utilizing active weak liquor flow control. Active control is especially advantageous in a system having a variable speed or multiple speed burner. In the FIG. 3 embodiment, weak liquor flow may be changed in discrete steps and is especially well suited for operation with discrete burner speed control. Discrete control of weak liquor flow is especially advantageous in a system having a burner with 2 or more discrete speeds. Such apparatus is disclosed in U.S. patent application Ser. No. 10/125,125, filed Apr. 16, 2002 (ROCKYR.113A), the description of which is incorporated herein by reference. In the embodiment illustrated in FIG. 3, the weak liquor flow from generator assembly 11 to absorber assembly 10 is directed along pipe 47 to splitter 51 to first and second piping 55 and 70, respectively. First piping 55 includes an actively controlled valve 56 and first restrictor 57. Second piping 70 includes a second restrictor 59. These two weak liquor flows provide high and low flow to accommodate weak solution concentrations within desired concentration ranges. For a high weak liquor flow, valve 56 is opened and weak liquor flowing from the generator to the absorber via pipe 47 splits at flow splitter 51, with a first portion passing through pipe 55, valve 56 and restriction 57, and a second portion passing through pipe 70 and restriction 59. In a low-flow mode, valve 56 is closed and all weak liquor flowing to the absorber passes through pipe 70 and restriction 59. Restrictions 57 and 59 may be any combination of orifices, capillary tubes, nozzles, or other fluid flow resistance elements known to those skilled in the art. Flow switching may be accomplished in response to changing operating conditions, such as ambient or load temperatures or weak solution concentrations, so as to maintain desired concentration range. Reduced weak liquor flow rates may also be used to enhance absorption system startup. Increased weak solution flow may be used to achieve short-term increases in cooling capacity. In the embodiment shown, a controller 58 operatively communicates with valve control device 87 which operates to open and close valve 56 for controlling the flow rate of weak liquor. The valve opening may be variably controlled or a valve which is open or closed. The valve may be mechanical or electronic. The controller is operatively connected to temperature-sensing device 53 in thermal contact with the bottom of generator 11 and operates valve 56 in response to the temperature sensed by device 53. Temperature-sensing device 53 may be placed within the generator in direct thermal contact with the solution inside the bottom of the generator rather than on the outside shell. Alternatively, a device for measuring some other physical property or condition of the weak liquor, such as refrigerant concentration, or a condition related to the weak liquor condition, or for sensing a condition of the apparatus or system such as load related conditions, for example, supply and/or return water temperature, or burner speed, may be substituted for temperature-sensing device 53 or used in combination with temperature sensing. Such detection, alone or combined with temperature sensing, is monitored by controller 58 for operating valve 56 to maintain desired concentration of ammonia in the weak liquor supplied to the absorber. The controller may also be thermostatically operated for controlling the valve opening whereby generator heating and weak liquor flow are changed in response to temperature conditions for which the heating and/or cooling system is used. By way of example, controller 58 may incorporate pulse-width modulation control algorithm software or firmware for controlling operation of valve 56 and cycling the valve to rapidly open and close, and the controller or microprocessor configured to operate using pulsed-width modulation in response to changes in temperature, pressure, concentrations, etc.

Electronic control of the weak solution flow and/or the burner firing rate may be based on sensing of the building load or one or more parameters representing the load. For example, chilled water supply or return air temperature is one measure of the relative capacities of the chiller versus the building load. The dropping of the temperature of the chilled water supply (or return) below a previously determined set point temperature is an indication that the chiller is operating at a greater capacity than is needed by the building load. In such a case, one or more of the weak solution control valve(s) would be closed or modulated more towards closing to reduce flow of weak solution, and, in conjunction, the burner would be modulated to reduce the firing rate. Conversely, if the chilled water supply (or return) temperature increases above a set point, one or more of the weak solution valve(s) would open or be modulated more towards opening to increase the flow of weak solution, and, in conjunction, the burner would be modulated to increase the firing rate. Electronic control apparatus, such as a controller or microprocessor such as described above, operatively connected to one or more components which sense the building load and/or parameters such as described may be used.

Figure 4A:
FIGS. 4a–f schematically illustrate different types of valving and flow restrictions for two-speed discrete flow control, and an example of valving used for three-speed flow control.
Figure 4B:
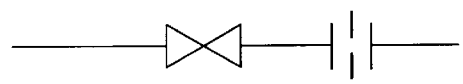
Figure 4C:
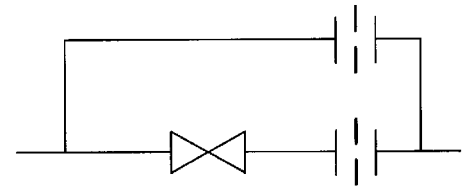
Figure 4D:
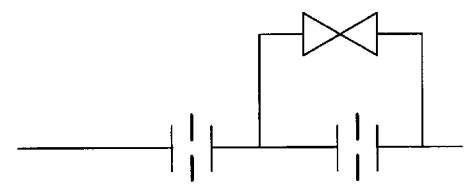
Figure 4E:
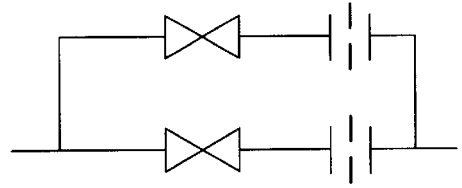
Figure 4F:
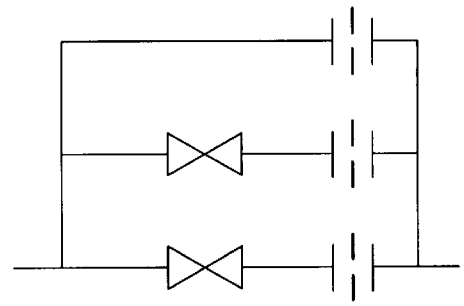

There are numerous ways of accomplishing switching of weak solution flow rates using valving, i.e., one or more valves, in combination with various fixed fluid flow resistance components. FIGS. 4a–f are illustrative of examples of different types of valving and flow restrictions which may be used. FIG. 4a illustrates the use of a valve that, when closed, still allows fluid flow, but with more flow resistance than when the valve is open. An example of such a valve is one in which a hole is drilled in the valve plug, whereby a small fluid flow passes through the small orifice drilled in the plug when the plug is seated, and when the plug is lifted from the valve seat, greater fluid flow passes through the larger restriction defined by the valve seat. Such a valve may be operated by a solenoid, or other type of control. FIG. 4b illustrates a similar drilled valve having a small and a large restriction when closed or opened, respectively, used in series with a restriction providing an additional flow resistance, which may be used either upstream or downstream of the valve. In FIG. 4c, a parallel resistance in a by-pass line is used in combination with a valve. The valve may be drilled as previously described, or it may be fully closed or opened. Again, the fixed resistance used in the same line with the valve may be upstream or downstream from the valve. Such an embodiment with parallel restrictions is like that illustrated in FIG. 3. FIG. 4d illustrates series of resistances with a single valve used to by-pass one resistance for high-flow. Again, the valve may be drilled for high and low flow, or have variable valve openings, either of which valves may be controlled. FIG. 4e shows parallel flow restrictions with a valve in series with each restriction. Such an embodiment may be preferred to the embodiment illustrated in FIG. 4c when it is desired to terminate weak solution flow completely, for example, for shutdown or other operational reasons. The above valve and restriction embodiments are useful for two weak liquor flow modes, high and low flow, and for two burner speed systems. FIG. 4f illustrates an example of valving and flow restrictions for a three-speed or three-step flow control. It will be understood that different combinations of valve and flow restrictions may be used, expandable to any desired number of weak liquor fluid flow controls. Any one or more of the valves may be operated for being fully opened or closed, such as a solenoid-operated valve, or may be controlled for variable opening.

In another embodiment shown in FIG. 3, a valve and temperature-sensing bulb are used for controlling refrigerant flow to the evaporator and controlling vapor superheat. A TXV 40 is positioned along pipe 42 for controlling the flow of refrigerant to evaporator 20. A temperature-sensing bulb 23 is positioned at or near the evaporator outlet on pipe 44, with a pressure conduit 25 communicating between the temperature-sensing bulb 23 and valve 40. A preferred valve used in the apparatus of the invention is a pulsed operation control valve disclosed in U.S. Pat. No. 5,675,982, the description of which is incorporated herein by reference. The use and operation of the valve for controlling superheat in such an apparatus is described in more detail in copending application Ser. No. 10/125,297, filed Apr. 16, 2002 (ROCKYR.104A) and incorporated herein by reference.

In the aqua-ammonia systems, the absorber 12 may be air cooled as illustrated in FIG. 2 or may be cooled by refrigerant such as described in U.S. Pat. No. Re. 36,684, the description of which is incorporated herein by reference. For such absorber cooling, FIG. 3 illustrates a portion of a refrigerant loop comprising a heat exchanger coil 84 in which condensed refrigerant supplied from condenser 14 is at least partially vaporized for cooling the absorber. Where such an embodiment is used, the apparatus may include a reservoir (not shown) for the condensed refrigerant. The refrigerant loop includes piping 83 which communicates with piping 85 for directing the vaporized refrigerant from the absorber heat exchanger coil where it is combined with refrigerant vapor from the rectifier 17 to piping 41 to the condenser 14. In such an embodiment, by combining refrigerant vaporized in cooling the absorber with refrigerant vapor from the rectifier flowing to the condenser, all heat rejection is achieved at the condenser. The rectifier 17 also preferably includes a reflux coil 13 for cooling and rectifying the vapor by heating and/or vaporizing refrigerant in the reflux coil or cooling coil. Such a refrigerant loop is also preferably used with valving such as one or more valves and more preferably a four-way valve for reversing refrigerant flow as disclosed in U.S. Pat. No. Re. 36,684. Such a valve-controlled refrigerant loop selectively directs the refrigerant to and from the condenser and the evaporator, each of which may alternately function to evaporate or condense refrigerant in a heat pump-type system. The above-described weak-liquor flow control and the absorber cooling and system heat rejection may be used in a dual-temperature appliance incorporating the aforesaid components and having a refrigerant loop in which refrigerant flow is not reversed and the condenser and evaporator heat exchange functions are not reversed.

What is claimed is:

1. An aqua-ammonia absorption cooling and/or heating apparatus comprising:

an absorber assembly, a generator assembly, a condenser, an evaporator, a refrigerant loop for directing refrigerant between said absorber assembly, generator assembly, condenser and evaporator, an absorption fluid loop for directing absorption fluid between said absorber assembly and said generator assembly, said absorption fluid loop including first piping for directing ammonia-rich absorption fluid from the absorber assembly to the generator assembly and second piping for directing ammonia-weak absorption fluid from the generator assembly to the absorber assembly, a valve assembly comprising one or more first valves cooperating with the second piping for controlling the flow rate of weak absorption fluid therein, and a temperature-sensing bulb in thermal contact with ammonia-weak absorption fluid in the generator assembly for opening and/or closing a first valve in response to the sensed temperature of the ammonia-weak absorption fluid, said valve assembly including a movable member for controlling the opening and closing thereof and having a first side exposed to the bulb pressure and a second side exposed to generator pressure or pressure of the ammonia-weak absorption fluid from the generator, wherein a first valve is opened and closed in response to pressure differential between the first and second side of the movable member.

2. An apparatus of claim 1 wherein said condenser and evaporator comprise first and second heat exchangers, respectively, each capable of functioning as a condenser or an evaporator, said apparatus having one or more second valves cooperating with said refrigerant loop for selectively reversing the flow of refrigerant to and from the said heat exchangers.

3. An apparatus of claim 2 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

4. An apparatus of claim 3 including a rectifier and a cooling coil therein in fluid communication with said refrigerant loop whereby condensed refrigerant is directed to said cooling coil and is heated and/or at least partially vaporized therein to cool said rectifier, and wherein said refrigerant loop includes piping for directing heated and/or vaporized refrigerant from said cooling coil to said condenser.

5. An apparatus of claim 1, 2, 3 or 4 wherein said absorber assembly includes an absorber, an absorber heat exchanger and a generator/absorber heat exchanger and wherein said absorption fluid loop includes one or more conduits for directing ammonia-rich absorption fluid in the absorber assembly from the absorber to the absorber heat exchanger and the generator/absorber heat exchanger.

6. An apparatus of claim 1, 2, 3 or 4 wherein a first valve has a pressure port exposed to the temperature-sensing bulb pressure and wherein said first side of the movable member is exposed to said pressure port, an inlet port communicating with said generator and an outlet port communicating with said absorber.

7. An apparatus of claim 5 wherein a first valve has a pressure port exposed to the temperature-sensing bulb pressure and wherein said first side of the movable member is exposed to said pressure port, an inlet port communicating with said generator and an outlet port communicating with said absorber.

8. An apparatus of claim 1 having a bulb charge composition comprising $FeCl_2.2/6(NH_3)$.

9. An apparatus of claim 1 including providing a bulb charge composition comprising $BaCl_2.1/2(H_2O)$.

10. An apparatus method of claim 1 including providing a bulb charge composition comprising a mixture of ammonia and water.

11. An apparatus of claim 10 wherein the concentration of ammonia is between about 1% and about 20%, by weight, of said bulb charge composition.

12. An aqua-ammonia absorption cooling and/or heating apparatus comprising:

an absorber assembly, a generator assembly, a condenser, an evaporator, a refrigerant loop for directing refrigerant between said absorber assembly, generator assembly, condenser and evaporator, an absorption fluid loop for directing absorption fluid between said absorber assembly and said generator assembly, said absorption fluid loop including first piping for directing ammonia-rich absorption fluid from the absorber assembly to the generator assembly and second piping for directing ammonia-weak absorption fluid from the generator assembly to the absorber assembly, a valve assembly comprising one or more valves cooperating with the second piping for controlling the flow rate of weak absorption fluid therein, and a sensing device for sensing concentration of the ammonia-weak absorption fluid or a property or condition correlated thereto and operatively connected to said valve assembly for operating said one or more valves in response to the sensed concentration or correlated property or condition of the ammonia-weak absorption fluid.

13. An apparatus of claim 12 wherein said absorber assembly includes an absorber, an absorber heat exchanger and a generator/absorber heat exchanger and wherein said absorption fluid loop includes one or more conduits for directing ammonia-rich absorption fluid in the absorber assembly from the absorber to the absorber heat exchanger and the generator/absorber heat exchanger.

14. An apparatus of claim 13 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

15. An apparatus of claim 14 including a rectifier and a cooling coil therein in fluid communication with said refrigerant loop whereby condensed refrigerant is directed to said cooling coil and is heated and/or at least partially vaporized therein to cool said rectifier, and wherein said refrigerant loop includes piping for directing heated and/or vaporized refrigerant from said cooling coil to said condenser.

16. An apparatus of claim 12 wherein said second piping includes one or more flow restriction devices in series or in parallel with said one or more valves.

17. An apparatus of claim 16 wherein said second piping includes a flow splitter and a plurality of conduits communicating therewith for directing portions of ammonia-weak absorption fluid to a said valve and said flow restriction device, respectively.

18. An apparatus of claim 16 wherein said second piping includes a flow splitter and first and second conduits communicating therewith, and a valve and/or a flow restriction device along said first and second conduits, and wherein said sensing device is operatively connected to at least one of said valves.

19. An apparatus of claim 12 or 17 wherein said valve assembly includes one or more valve control components operatively connected to said sensing device.

20. An apparatus of claim 12 or 17 including a controller having a controller function component for controlling operation of said one or more valves, and wherein said sensing device is operatively connected to said controller or controller function component.

21. An aqua-ammonia absorption cooling and/or heating apparatus comprising:

an absorber assembly, a generator assembly, a condenser, an evaporator, a refrigerant loop for directing refrigerant between said absorber assembly, generator assembly, condenser and evaporator, an absorption fluid loop for directing absorption fluid between said absorber assembly and said generator assembly, said absorption fluid loop including first piping for directing ammonia-rich absorption fluid from the absorber assembly to the generator assembly and second piping having one or more flow restriction devices for directing ammonia-weak absorption fluid from the generator assembly to the absorber assembly, a sensing device for sensing a condition and a valve assembly communicating therewith comprising one or more valves cooperating with the second piping and said flow restriction devices for controlling the flow rate of weak absorption fluid therein in response to a sensed condition.

22. An apparatus of claim 21 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

23. An apparatus of claim 22 including a rectifier and a cooling coil therein in fluid communication with said refrigerant loop whereby condensed refrigerant is directed to said cooling coil and is heated and/or at least partially vaporized therein to cool said rectifier, and wherein said refrigerant loop includes piping for directing heated and/or vaporized refrigerant from said cooling coil to said condenser.

24. An apparatus of claim 21, 22 or 23 wherein said absorber assembly includes an absorber, an absorber heat exchanger and a generator/absorber heat exchanger and wherein said absorption fluid loop includes one or more conduits for directing ammonia-rich absorption fluid in the absorber assembly from the absorber to the absorber heat exchanger and the generator/absorber heat exchanger.

25. An apparatus of claim 21 wherein said second piping includes one or more flow restriction devices in series or in parallel with one or more of said valves.

26. An apparatus of claim 25 wherein said second piping includes a flow splitter and a plurality of conduits communicating therewith for directing portions of ammonia-weak absorption fluid to a said valve and said flow restriction device, respectively.

27. An apparatus of claim 21 wherein said valve assembly includes a valve control component operatively communicating with a control device.

28. An apparatus of claim 27 wherein said second piping includes a flow splitter and first and second conduits communicating therewith, and a valve and/or a flow restriction device along said first and second conduits, and wherein said control device is operatively connected to at least one of said valves.

29. An apparatus of claim 21 including a sensing device operatively communicating with said valve for opening and/or closing the valve in response to a sensed condition.

30. An apparatus of claim 29 wherein said sensed condition comprises a load related condition.

31. An apparatus of claim 30 wherein said load related condition comprises chilled water supply and/or return water temperature.

32. An apparatus of claim 29 wherein said sensed condition comprises burner speed.

33. An apparatus of claim 29 wherein said sensed condition comprises absorption fluid pressure, temperature and/or concentration.

34. An apparatus of claim 29 wherein said sensing device is in sensible contact with ammonia-weak absorption fluid.

35. An apparatus of claim 29 including a controller or microprocessor operatively communicating with said valve and said sensing device for opening and/or closing said valve.

36. An apparatus of claim 35 wherein said sensing device senses a load condition.

37. An apparatus of claim 35 wherein said valve is operated by pulse-width modulation control.

38. An apparatus of claim 29 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

39. An apparatus of claim 38 including a rectifier and a cooling coil therein in fluid communication with said refrigerant loop whereby condensed refrigerant is directed to said cooling coil and is heated and/or at least partially vaporized therein to cool said rectifier, and wherein said refrigerant loop includes piping for directing heated and/or vaporized refrigerant from said cooling coil to said condenser.

40. An apparatus of claim 29 wherein said absorber assembly includes an absorber, an absorber heat exchanger and a generator/absorber heat exchanger and wherein said absorption fluid loop includes one or more conduits for directing ammonia-rich absorption fluid in the absorber assembly from the absorber to the absorber heat exchanger and the generator/absorber heat exchanger.

41. An apparatus of claim 21 including electronic control apparatus operatively connected to said one or more valves and one or more components for sensing building load and/or one or more parameters thereof operatively connected to said electronic control apparatus for controlling the operation of said one or more valves in response to load and/or one or more load parameters.

42. An apparatus of claim 41 wherein said one or more load parameters comprise chilled water or return temperature.

43. An apparatus of claim 1, 12 or 21 comprising a temperature-sensing bulb in thermal contact with said evaporator at or near the evaporator outlet and a refrigerant control valve cooperating with said refrigerant piping, wherein said refrigerant control valve includes a pressure port exposed to the temperature-sensing bulb pressure, and a movable member exposed to said pressure port and responsive to bulb pressure for operating said valve and for controlling refrigerant flow therethrough in response to temperature sensed by the temperature-sensing bulb, said movable member having a first side exposed to temperature-sensing bulb pressure and a second side exposed to evaporator pressure, whereby said movable member causes the refrigerant control valve to operate in response to the pressure differential between the temperature-sensing bulb and the evaporator, and wherein said temperature-sensing bulb is located above said movable member.

44. An apparatus of claim 43 wherein said refrigerant control valve comprises a pulsed operation control valve comprising:
- an inlet port in communication with said condenser having an inlet flow area for receiving condensed refrigerant, and a valve for opening and closing said inlet port;
- an outlet port having an outlet flow area and communicating with said evaporator for directing liquid refrigerant thereto;
- a valve cavity between said inlet port and said outlet port and in open communication therewith;
- said valve being responsive to pressure within said valve cavity for operating the valve and controlling the opening and closing of said inlet port, and wherein higher pressure therein biases said valve to close said inlet port and lower pressure therein biases valve to open said inlet port; and
- said inlet flow area being at least twice the size of said outlet flow area whereby opening said inlet port provides for rapid pressure buildup in said cavity and rapid closure thereof after each opening.

45. A method of improving efficiency of an aqua-ammonia absorption heating and/or cooling system in which ammonia-weak absorption fluid is directed through piping from the generator assembly to the absorber assembly comprising providing one or more valves cooperating with the piping capable of controlling the flow of fluid therethrough, and a temperature-sensing device in thermal contact with the ammonia-weak absorption fluid, and operating said one or more valves in response to the temperature of said ammonia-weak absorption fluid.

46. A method of claim 45 comprising monitoring the ammonia-weak absorption solution temperature in the generator assembly where the solution is at or near its bubble-point temperature.

47. A method of claim 45 or 46 wherein said valve is operated by a movable member, wherein said temperature-sensing device is a temperature-sensing bulb, and wherein a first side of said movable member is exposed to bulb pressure and a second side thereof is exposed to generator pressure or ammonia-weak absorption fluid at or near generator pressure, and comprising controlling the flow of said ammonia-weak absorption fluid by opening and closing said valve in response to pressure differential between bulb pressure and generator pressure.

48. A method of claim 47 including providing a bulb charge composition comprising $FeCl_2.2/6(NH_3)$.

49. A method of claim 47 including providing a bulb charge composition comprising $BaCl_2.1/2(H_2O)$.

50. A method of claim 47 including providing a bulb charge composition comprising a mixture of ammonia and water.

51. A method of claim 50 wherein the concentration of ammonia in a said bulb charge composition is between about 1% and about 20% by weight.

52. In an aqua-ammonia absorption heating and/or cooling system in which ammonia-weak absorption fluid is directed from the generator to the absorber a method of maintaining the concentration of ammonia in the ammonia-weak absorption fluid comprising controlling the flow rate of said ammonia-weak absorption fluid directed from said generator to said absorber.

53. A method of claim 52 including sensing the temperature, pressure or concentration of said ammonia-weak absorption fluid in said generator and controlling said flow rate in response thereto.

* * * * *